United States Patent
Jagdale et al.

(10) Patent No.: US 8,347,393 B2
(45) Date of Patent: Jan. 1, 2013

(54) METHOD AND SYSTEM FOR DETECTING A STATE OF A WEB APPLICATION USING A SIGNATURE

(75) Inventors: Prajakta Subbash Jagdale, Alpharetta, GA (US); Gerald Eugene Sullivan, Roswell, GA (US); Leonid Promyshlyansky Bensman, Alpharetta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1029 days.

(21) Appl. No.: 12/351,788

(22) Filed: Jan. 9, 2009

(65) Prior Publication Data

US 2010/0180193 A1 Jul. 15, 2010

(51) Int. Cl.
*G06F 12/14* (2006.01)
*H04L 9/32* (2006.01)

(52) U.S. Cl. .......................................... 726/25; 713/180
(58) Field of Classification Search .................... 726/25; 713/180
See application file for complete search history.

(56) References Cited

U.S. PATENT DOCUMENTS

| | | | |
|---|---|---|---|
| 2003/0167355 A1* | 9/2003 | Smith et al. | 709/328 |
| 2005/0149759 A1* | 7/2005 | Vishwanath et al. | 713/201 |
| 2005/0188222 A1 | 8/2005 | Motsinger et al. | 713/201 |
| 2008/0059846 A1* | 3/2008 | Rosenthal et al. | 714/100 |
| 2008/0147642 A1* | 6/2008 | Leffingwell et al. | 707/5 |
| 2008/0270883 A1* | 10/2008 | Friedman et al. | 715/209 |

OTHER PUBLICATIONS

Cannarozzi, Gina, M., "String Alignment Using Dynamic Programming", 2005, pp. 1-10, http://biorecipes.com/DynProgBasic/code.html (printed Oct. 15, 2008).

* cited by examiner

*Primary Examiner* — Techane Gergiso (57) ABSTRACT

A method and system for generating a signature for determining whether a web page is in a first state or a second state, comprising the steps of selecting a plurality of web pages for processing, requesting the web pages in the first state, dividing the first state pages into a first set of text blocks, requesting the web pages in the second state, dividing the second state pages into a second set of text blocks, eliminating from the first and second sets the text blocks that are common between the first and second set, generating a signature comprising the text blocks of the first set as a component indicative of the first state and the text blocks of the second set as a component indicative of the second state.

21 Claims, 8 Drawing Sheets

LOGOUT DETECTION ALGORITHM

| Step I | Login to the site | |
|---|---|---|
| Step II | Select a web page for analysis | Criteria: Any page that contains at least 5 URLs in logged in state. |
| Step III | Request the selected page | |
| Step IV | Generate a list of keywords | |
| | Step a. Randomly select a predefined number of URLs and for each URL execute the following steps. | |
| | Step b. Request selected URL | Response received (logged in response)<br><br><div align="right"><br> <a href="default.asp">HOME</a><br> <a href="welcome.asp">MY ACCOUNT</a><br> <a href="procLogout.asp">LOGOUT</a><br></div><br><div id="copyright"><br> Copyright 2004 SPIDynamics<br></div> |
| | Step c. Divide response text into blocks based on the HTML structure. This includes:<br>• Combining all content that appears in any of the following tags into a single block (<div>, <table>, <form>, <p>, <pre>, <h1>, <h2>, <h3>, <h4>, <h5>, <h6>, <ul>, <hr>)<br>• Discard all HTML content within the blocks | ~~<div align="right">~~<br>~~<a href="default.asp">~~HOME~~</a>~~<br>~~<a href="welcome.asp">~~MY ACCOUNT~~</a>~~<br>~~<a href="procLogout.asp">~~LOGOUT~~</a>~~<br>~~</div>~~<br>~~<div id="copyright">~~<br>Copyright 2004 SPI Dynamics<br>~~</div><br><br>HOME MY ACCOUNT LOGOUT<br>(Negative block #1)<br><br>Copyright 2004 SPIDynamics<br>(Negative block #2) |

FIG. 4A

LOGOUT DETECTION ALGORITHM

| | Step d. | Repeat steps (b) and (c) w/o session information | `<div align="right">`<br>`<a href="default.asp">HOME</a>`<br>`<a href="welcome.asp">SIGNUP</a>`<br>`<a href="procLogout.asp">LOGIN</a>`<br>`</div>`<br>`<div id="copyright">`<br>Copyright 2004 SPI Dynamics<br>`</div>`<br>HOME SIGNUP LOGIN<br>(Positive block #1)<br><br>Copyright 2004 SPIDynamics<br>(Positive block #2) |
|---|---|---|---|
| | Step e. | Eliminate blocks common between (c) i.e. logged in response and (d) i.e. logged out response because these blocks do not help us distinguish between the two states. | Logged In / Logged out<br><br>HOME MY ACCOUNT LOGOUT / HOME SIGNUP LOGIN<br><br>~~Copyright 2004 SPIDynamics~~ / ~~Copyright 2004 SPIDynamics~~<br><br>Negative Component / Positive Component |
| | Step f. | \multicolumn{2}{l}{Assign weights to the remaining blocks based on the frequency of their occurrence and form a signature consisting of most strongly weighted blocks.} |

| | | | LOGGED IN | LOGGED OUT |
|---|---|---|---|---|
| | Response #1 | block #1 | HOME MY ACCOUNT LOGOUT (1) | HOME SIGNUP LOGIN (1) |
| | | block #2 | Review your account information Update your account details View your current orders (1) | |
| | Response #2 | block #1 | HOME MY ACCOUNT LOGOUT (+1) | HOME SIGNUP LOGIN (+1) |
| | Response #3 | block #1 | HOME MY ACCOUNT LOGOUT (+1) | HOME SIGNUP LOGIN (+1) |
| | | block #2 | Welcome Billy Banks (1) | Please Login (1) |

| Step V | Blocks with highest weights<br>HOME MY ACCOUNT LOGOUT (3) - Negative component<br>HOME SIGNUP LOGIN (3)          - Positive component<br><br>SIGNATURE<br>HOME SIGNUP LOGIN    and not    HOME MY ACCOUNT LOGOUT |
|---|---|

METHOD AND SYSTEM FOR DETECTING A STATE OF A WEB APPLICATION USING A SIGNATURE

BACKGROUND

Web pages behave differently based on the session state. For example, different or additional links may be available to a user who has been authenticated. These additional or different links may not be visible to a guest user, that is, a user that has not been authenticated.

Often, web assessment tools are used to scan entire web sites for various reasons. For example, security assessment tools may be used to scan entire web sites to identify security vulnerabilities so that the defects in the web site can be fixed promptly and effectively. Since the web assessment tools would need to scan the entire web site, if the web assessment tool is not aware of the session state, the web assessment tool may, for instance, scan web pages in a logged out state, and thus may miss links that may be available in the logged in state. When that happens, the coverage achieved by the web assessment tool may be compromised, causing the result of the scan and the effectiveness of the web assessment tool to be affected. A logged out event detection mechanism may be used to keep the web assessment tool up to date with respect to the session state and allow the web assessment tool, for instance, to remain in the logged in state so that accurate scan results may be achieved.

BRIEF DESCRIPTION OF THE DRAWINGS

Embodiments of a method and system for detecting the state of a web application using a signature, and for generating the signature, are further described with reference to the accompanying drawings in which.

DETAILED DESCRIPTION OF THE EMBODIMENTS

The embodiments to be described provide a method and system for system for generating a signature to detect a logout event although it will be understood that the techniques described may also be suitable for detection of other distinguishable web application states and state changes.

The embodiments sample web pages in both a first state—a logged out state—and a second state—a logged in state. The web page content in both logged in and logged out states are then analyzed to generate blocks of text that differentiate between the logged in and logged out states. During a web assessment scan, the signature is used to compare with the web site content in order to detect whether a logged out event has occurred. A logged out event may occur due to session expiration, an intentional request for log out, or any other intended or unintended reasons.

In an exemplary embodiment, in order to detect the occurrence of a logout event, web pages on a target web site in both logged in and logged out states are sampled. The content of the sampled web pages are then analyzed to generate a detection signature. The signature may comprise two lists, with each list comprising one or more blocks of text. The blocks of text may be derived from the contents that are sampled. One of the lists may include blocks of text that are encountered during a logged out state. These blocks of text may be denoted as the positive components of the detection signature, since these blocks of text provide indication that a logged out event has occurred. Another list may include blocks of text that are encountered during a logged in state. These blocks of text may be denoted as the negative components of the detection signature, since these blocks of text provide indication that a logged out event has not occurred.

Since the detection signature is dynamically generated, the detection signature is based on the content of the target website. Thus, the detection signature provides much better detection for a logged out event than pre-defined keywords. Furthermore, the detection signature is generated from contents of multiple web pages rather than a single page, and hence can increase the accuracy of the detection signature.

Figure 1:
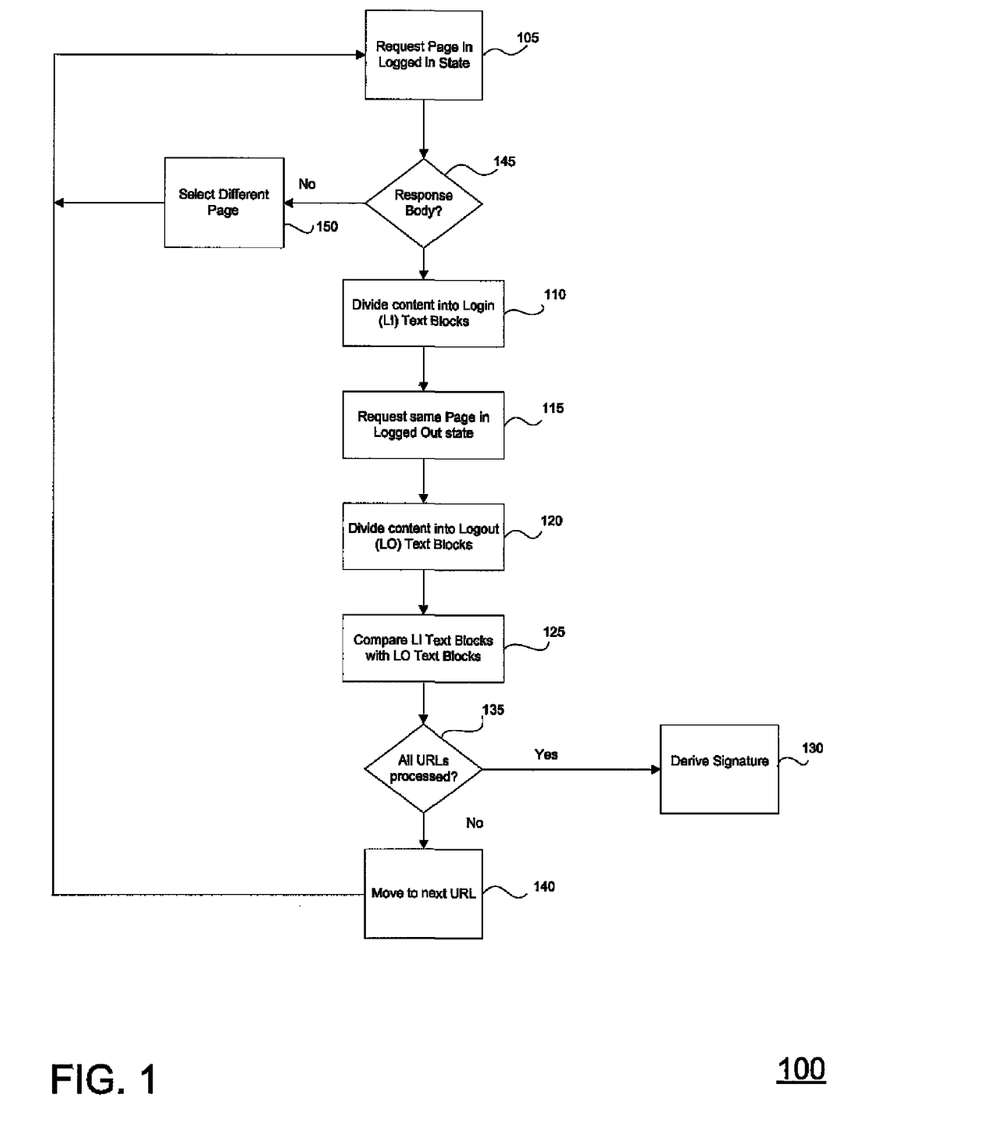
FIG. 1 is a flow diagram showing an exemplary method and system for generating a signature to detect a logout event according to one of the exemplary embodiments.
Figure 7:
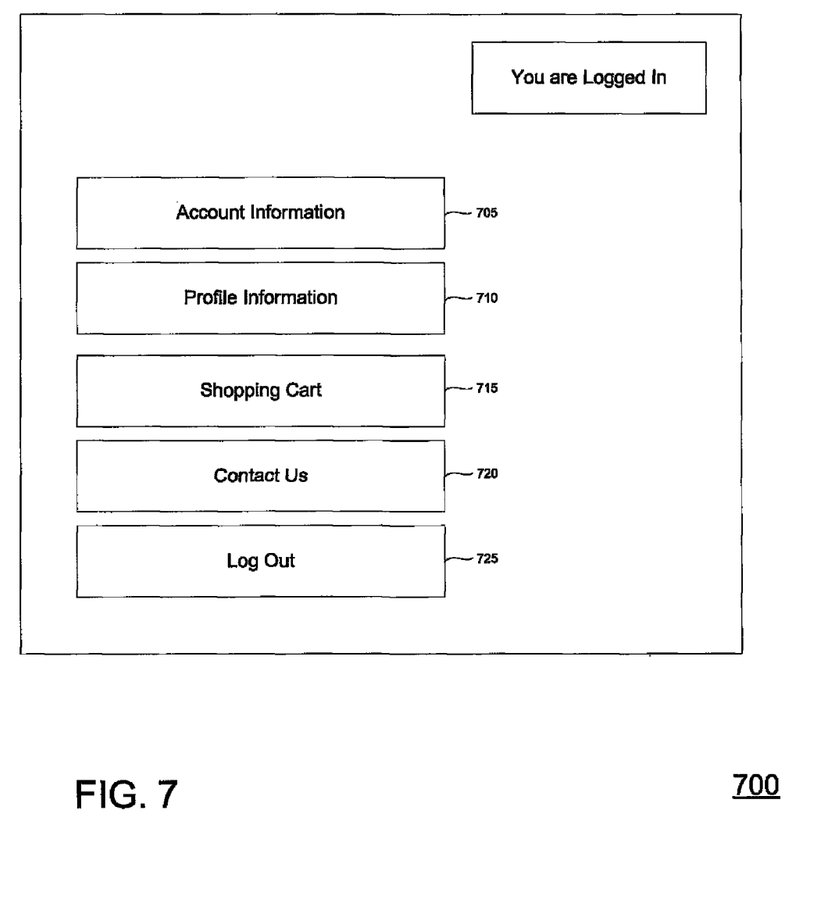
FIG. 7 is an example of a web page with which the exemplary embodiments described in FIGS. 1-4 may be used.

In an exemplary embodiment, the method for tuning the computer system may be illustrated by the flow diagram of FIG. 1. For example, the method may be performed by software running locally on a computer, a server, a laptop, or remotely. First, a user is asked to log in to a web site, thus making the web pages in logged in state. Then, a web page of the target web site is selected for analysis. The web page may be selected according to any criteria, for example, the home page may be selected. An example of a web page may be illustrated by FIG. 7. As shown in FIG. 7, there are a plurality of URLs 705, 710, 715, 720, and 725 that are available on the web page 700. After the web page of the target web site is selected, a pre-determined number of URLs are randomly selected from the selected web page. The number of URLs may be pre-determined according to any criteria, such as processing time, accuracy, etc. For example, if processing resources and time permit, the number of URLs selected may be higher. On the other hand, if the processing resources and time is limited, the number of URLs selected may be lower. As shown in FIG. 7, five URLs 705, 710, 715, 720, and 725 on the web page may be selected. Once the URLs are selected, the web pages corresponding to the URLs are requested and processed according to FIG. 1.

Following FIG. 1, while the web site is still in logged in state, a web page corresponding to one of the selected URLs is requested at step 105. The process then proceeds to step 145 where a check may be performed to determine whether the content of the web page has a response body. If the check at step 145 indicates that the content of the web page does not have a response body, the process then proceeds to step 150 where a different URL is selected. After a different URL is selected at step 150, the process returns to step 105 where the web page corresponding to the newly selected URL is requested.

If the check at step 145 determines that the content of the web page has a response body, the process proceeds to step 110. The content of the web page is then divided into one or more blocks of text that represent various areas of the web page at step 110. For example, the blocks of text may represent the footer of the page, the menu of the page, the body of the page, etc. The content of the web page may be divided according to any methodology, for example, the content of the web page may be divided according to HTML tags. For example, the HTML source of the web page may include tags such as <div></div>, <table></table>, <p></p>, etc. The content that is within a set of HTML tags, such as <table></table>, may be defined as one block of text. The type of HTML tags that may be used to define blocks of text may be pre-determined according to any criteria, for example, the HTML tags that may be used may be pre-determined according to the particular content structure of the target web site. Contents of the entire web page may be divided, or in the alternative, only certain portion of the contents of the web page may be divided.

Further in FIG. 1, after the blocks of text are obtained from the selected web page under a logged in state, the same web page is requested under a logged out state in step 115. The web page may be requested under a logged out state by various ways, for example, the web page request may be sent without any authentication session information, such as cookie values. When the web page is requested under a logged out state, in step 120, the content of the web page is divided into blocks of text in the same way as the web page under the logged in state.

After the blocks of text from the web page in both the logged in state and logged out state are obtained, in step 125, the text blocks from the web page in logged in state and logged out state are compared. Blocks that are common between the logged in text blocks and the logged out text blocks are considered as representing contents that exist regardless of the login status. These text blocks cannot aid in the determination of whether the web site is in logged in state or logged out state. Thus, these text blocks are discarded.

After the text blocks that are common between the logged in state and logged out state are discarded, the remaining text blocks are divided up into two lists: a positive list and a negative list. The text blocks that are present when the web site is in logged out state are added to the positive list, since those text blocks indicate that the web site is in logged out state. On the other hand, the text blocks that are present when the web site is in logged in state are added to the negative list, since those text blocks indicate that the web site is in logged in state, that is, the negative of, or the anti-logged out state.

Figure 2:
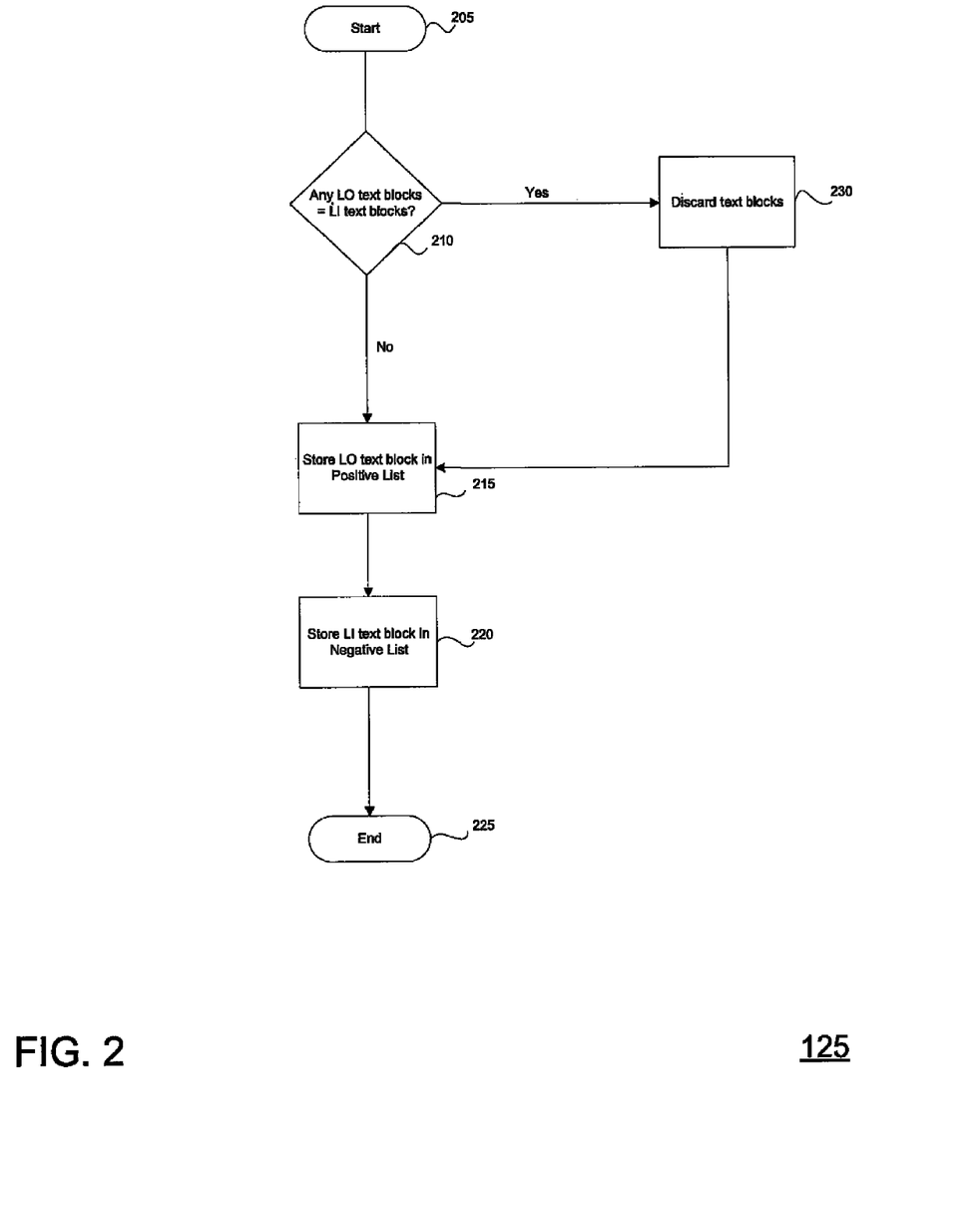
FIG. 2 is a flow diagram showing an exemplary method and system for generating a signature to detect a logout event according to one of the exemplary embodiments.

In one exemplary embodiment, the text blocks comparison process in step 125 may be illustrated by the flow diagram of FIG. 2. According to FIG. 2, the process begins at step 205, then proceeds to step 210, where the text blocks obtained from the logged in state are compared with the text blocks obtained from the logged out state to determine if the text blocks obtained from the logged in state are common with the text blocks obtained from the logged out state. The text blocks may be compared using any string comparison algorithm. For example, basic string equality may be used to determine whether the strings are matching.

More sophisticated algorithms, such as a variation of a string alignment algorithm, may also be used for comparing the text blocks. For example, a classic string alignment algorithm aligns characters in words, a variation of a string alignment algorithm may align words in blocks of text in order to perform comparison between the text blocks from the web page in logged in state and logged out state.

If the comparison at step 210 indicates that there are one or more text blocks obtained from the logged in state in common with one or more text blocks obtained from the logged out state, the process proceeds to step 230, where the text blocks that are common between the logged in state and the logged out state are discarded. Afterwards, the process proceeds to step 215.

If the comparison at step 210 indicates that no text blocks obtained from the logged in state are in common with the text blocks obtained from the logged out state, the process proceeds to step 215, where the text blocks obtained from the logged out state are added to a positive list. Similarly, if the common text blocks are discarded in step 230, the process proceeds to step 215 where the remaining text blocks obtained from the logged out state are added to a positive list.

After the text blocks obtained from the logged out state are added to the positive list, the process proceeds to step 220, where the text blocks obtained from the logged in state are added to a negative list. After the text blocks are added to their respective positive and negative lists, the process proceeds to 225 where it ends and returns to step 125 in FIG. 1.

Following back to FIG. 1, after the text blocks are divided into a positive and a negative list at step 125, the process proceeds to step 135 where a check is performed to determine whether all the selected URLs have been processed. If the check determines that not all the selected URLs have been processed, the process proceeds to step 140. At step 140, the process moves to the next URL and then reverts back to step 105, so that the next URL may be processed the same way.

If the check performed at step 135 determines that all the URLs have been processed, the process proceeds to step 130 where the logged out detection signature is derived. To derive the logged out detection signature, the positive lists and negative lists derived from processing selected URLs are combined. For example, the positive list generated from processing URL1 may be combined with the positive list generated from processing URL2. Similarly, the negative list generated from processing URL1 may be combined with the negative list generated from processing URL2. Each of the combined positive list and the negative list would include two or more text blocks. A weight is then assigned to each of the text block in each list. For each occurrence of a text block in a list, the weight of the text block may be incremented by one. For example, if a text block "logged out" appears three times in the positive list, then the text block "logged out" may be assigned a weight of three.

The text blocks with the highest weight value, that is, the text blocks that appear with the highest frequencies become the strongest candidates for the detection signature. For example, the text block with the highest weight value in the positive list (the positive text block) becomes the strongest candidate for the positive component of the detection signature, and the text block with the highest weight value in the negative list (the negative text block) becomes the strongest candidate for the negative component of the detection signature. After the text blocks with the highest weight values are identified for each list, the detection signature is derived by using the positive text block as the positive component and the negative text block as the negative component.

Figure 3:
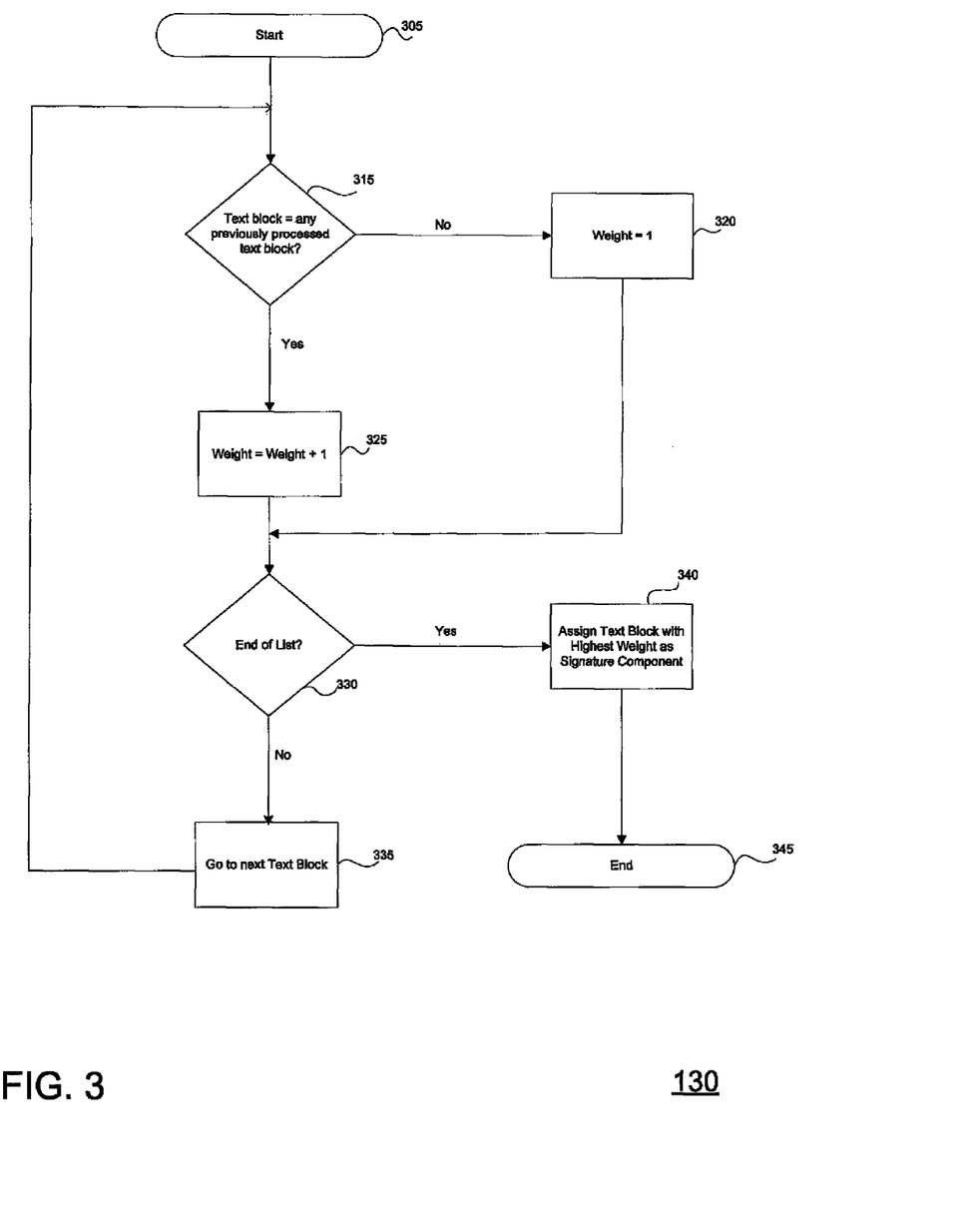
FIG. 3 is a flow diagram showing an exemplary method and system for generating a signature to detect a logout event according to one of the exemplary embodiments.

In one exemplary embodiment, the logged out detection signature creation process in step 130 of FIG. 1 may be illustrated by the flow diagram of FIG. 3. First, the text blocks in the positive list are processed. According to FIG. 3, the process begins at step 305 and then proceeds to step 315. At step 315, a check is performed to determine if the text block is the same as any text blocks that has been previously processed and assigned a weight. If the check at step 315 determines that the text block is not the same as any of the text blocks that have been previously assigned a weight, the process proceeds to step 320, where a weight of 1 is assigned to that text block. Processing then proceeds to step 330. If the check at step 315 determines that the text block is the same as one of the text blocks that have been previously assigned a weight, the process proceeds to step 325. At step 325, the previously assigned weight of the text block is incremented by 1.

After the weight is assigned to the text block, processing proceeds to block 330 where a check is performed to determine whether all the text blocks in the list have been processed. If the check at step 330 determines that not all the text blocks in the list have been processed, processing proceeds to step 335 where the next text block is selected. Processing then loops back to step 315 where the next text block is processed the same way, resulting in a weight being assigned to the text block.

If the check at step 330 determines that all the text blocks in the list have been assigned weights, processing proceeds to step 340. At step 340, the text block with the highest weight may then be assigned as the positive component of the logged off detection signature. The process then proceeds to step 345 where it ends.

After the text blocks in the positive list have been assigned weights and a positive component of the logged off detection signature has been derived, the text blocks in the negative list may be processed the same way. Text blocks in the negative list are assigned weights according to the frequency of the occurrence of the same text block in the negative list. The text block with the highest weight may then be assigned as the negative component of the logged off detection signature.

Figure 4A:
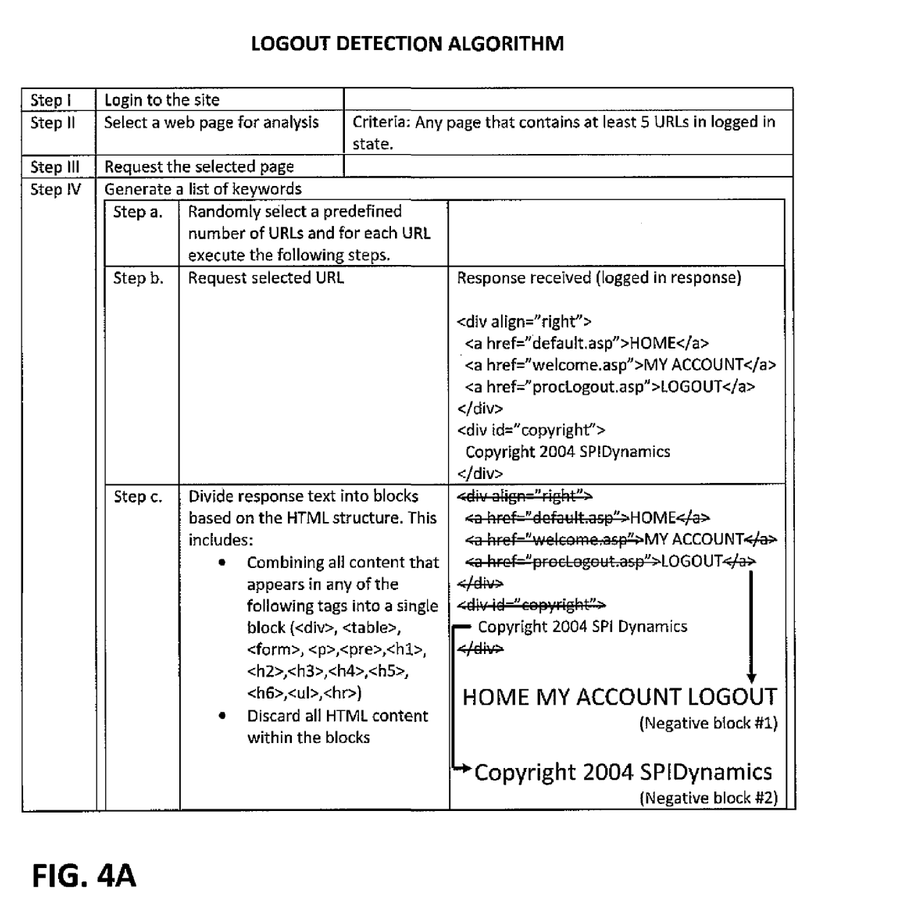
FIGS. 4A and 4B represent a block diagram showing an example of the method and system for generating a signature to detect a logout event according to one of the exemplary embodiments.
Figure 4B:
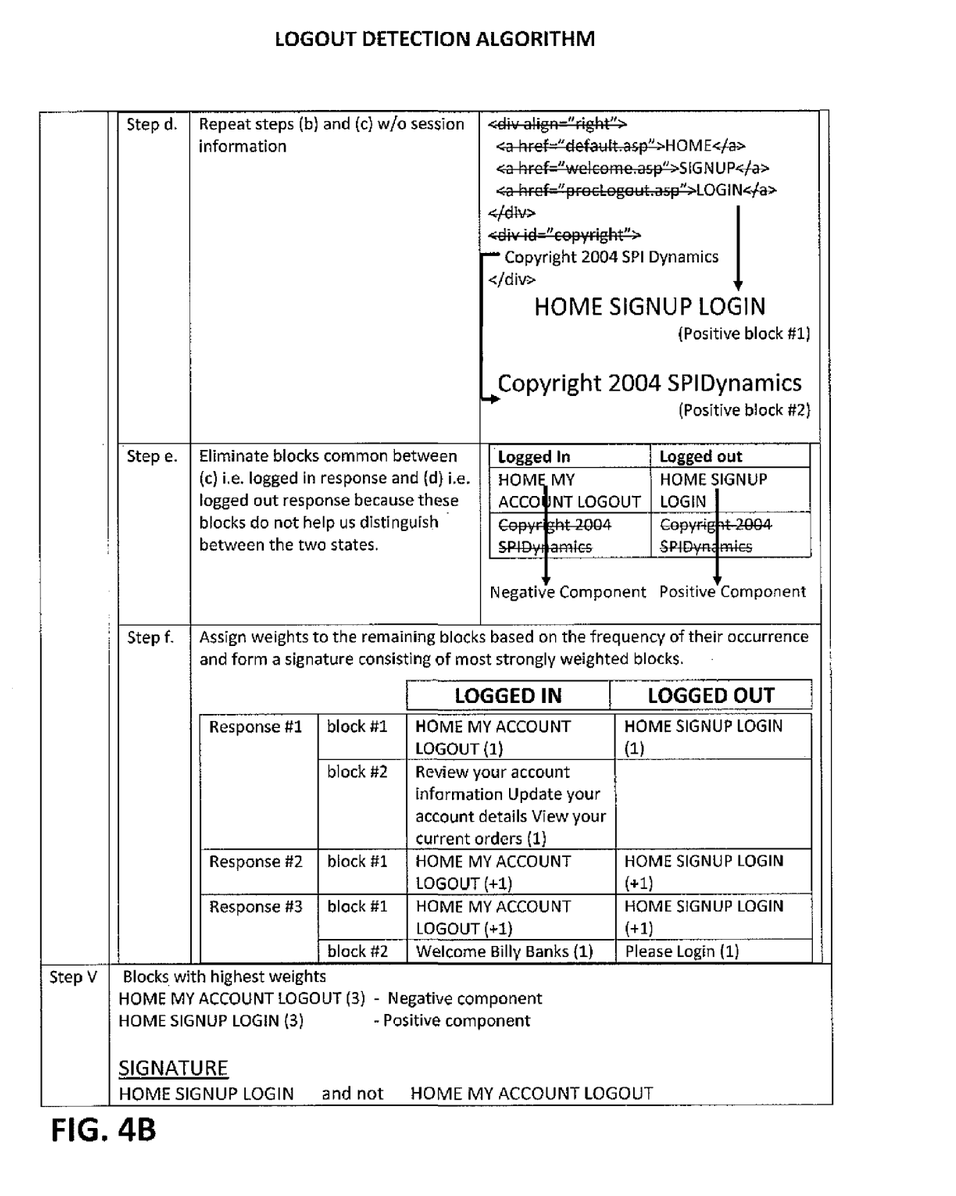

An example of the process for generating a logged off detection signature as discussed in reference to FIGS. 1-3 may be further illustrated by the block diagram of FIGS. 4A and 4B. In the illustration of FIG. 4A, at step I, a log in is performed to put the web site in a logged in state. Then, at step II, a web page is selected for analysis. In this exemplary embodiment, the pre-determined number of URLs for analysis is set at 5. Therefore, the criteria for selection of a web page for analysis would be any page that contains at least 5 URLs in a logged in state such that at least 5 URLs from the web page may be selected for analysis. After a web page has been selected for analysis, the process proceeds to step III, where the selected web page is requested. Following the request of the selected web page, the process proceeds to step IV, where text blocks in logged in state are collected.

Following FIG. 4A, step IV may comprise a number of substeps to generate a logged out detection signature. First, at substep a, a pre-determined number of URLs are selected, and each URL may be processed following substep b to e.

At substep b, the selected URL is requested, and an example of the response received is shown in the corresponding column. As shown, the content of the web page of the selected URL includes HTML tags. After the selected URL is requested, the process proceeds to substep c where the content of the web page is divided into text blocks based on the HTML structure of the content of the web page. This process is achieved by first combining the content that appears within certain HTML tags. For example, content that appears within <div> and </div>, <table> and </table>, <form> and </form>, <p> and </p>, <pre> and </pre>, <h1> and </h1>, <h2> and </h2>, <h3> and </h3>, <h4> and </h4>, <h5> and </h5>, <h6> and </h6>, <ul> and </ul>, or <hr> and </hr>. After the content that appears within certain HTML tags are combined, all HTML code within the content may be discarded to form desired text blocks. As shown in the example in substep c of FIG. 4A, the content of the web page is divided into two text blocks, the first block including the content within the first <div> and </div> tag, and the second block including the content within the second <div> and </div> tag. After the content of the web page is divided according to the <div> and </div> tags, the HTML code within the content is discarded. As shown in the example of FIG. 4A, the HTML code <div>, <a href>, etc. are discarded, thus deriving text block #1 of "HOME MY ACCOUNT LOGOUT" and text block #2 of "© Copyright 2004 SPI Dynamics."

After the negative text blocks are generated from the web page content in a logged in state, the process proceeds to substep d of FIG. 4B, where the substeps b and c are repeated for the same web page in a logged out state. Hence, the same web page may be requested without session information such that the web page that would be received in response would be in logged out state. An example of the content of the web page received in response is shown in FIG. 4B substep d. After the content of the web page in logged out state is received, the process proceeds to repeat substep b and c to obtain positive text blocks from the content of the web page. As shown in FIG. 4B, positive text block #1 of "HOME SIGNUP LOGIN" and positive text block #2 of "©Copyright 2004 SPI Dynamics" are obtained.

After both the negative and positive text blocks are obtained, the process proceeds to substep e, where blocks that are common in the negative and positive text blocks are discarded. For example, the text block "© Copyright 2004 SPI Dynamics" appears in both the positive text blocks and negative text blocks. Since the text block "© Copyright 2004 SPI Dynamics" appears regardless whether the web site is in logged in state or logged out state, the text block is not considered useful or helpful in distinguishing between a logged in state and a logged out state. Therefore, the text block "© Copyright 2004 SPI Dynamics" may be discarded. On the other hand, the text blocks that are not common between the positive text blocks and the negative text blocks are kept and are added to a positive list and a negative list, respectively. For example, the negative text block "HOME MY ACCOUNT LOGOUT" is not in common with any of the positive text blocks, thus the negative text block "HOME MY ACCOUNT LOGOUT" may be added to the negative list. Similarly, the positive text block "HOME SIGNUP LOGIN" is not in common with any of the negative text blocks, thus the positive text block "HOME SIGNUP LOGIN" may be added to the positive list.

After the positive and negative lists are generated for a selected URL, the substeps b through e are repeated for all the selected URLs. Thus, a positive list and a negative list would be generated for each URL after the process.

After a positive list and a negative list are generated for each URL, the process proceeds to substep f, where the negative lists from each URL are aggregated into a final negative list and the positive lists from each URL are aggregated into a final positive list.

After the final negative list and the final positive list are generated, for each list, weights are assigned to the text blocks in the final lists based on the frequency of the occurrence of the text blocks. That is, for each of the text block in the negative list, a weight is assigned to each text block according to the number of times the same text block appears in the negative list. Similarly, for each of the text block in the positive list, a weight is assigned to each text block according to the number of times the same text block appears in the positive list. As shown in the example in substep f of FIG. 4B, a final positive list and a final negative list are generated from three URLs (Response #1, Response #2, and Response #3).

First, weights are assigned to text blocks in the final negative list. As shown in FIG. 4B, Response #1 includes two negative text blocks block #1 ("HOME MY ACCOUNT LOGOUT") and block #2 ("Review your account information Update your account details View your current orders"). Response #2 include one negative text block block #1 ("HOME MY ACCOUNT LOGOUT"). Response #3 include two negative text blocks block #1 ("HOME MY ACCOUNT LOGOUT") and block #2 ("Welcome Billy Banks").

For block #1 of Response #1, a weight of 1 is assigned since it is the first time "HOME MY ACCOUNT LOGOUT" appears in the final negative list. Similarly, for block #2 of Response #1, a weight of 1 is assigned since it is the first time "Review your account information Update your account details View your current orders" appears in the final negative list. For block #1 of Response #2, the weight is incremented by 1 because it is the second time "HOME MY ACCOUNT LOGOUT" appears in the final negative list. Following the process, for block #1 of Response #3, the weight is incremented by 1 again because it is the third time "HOME MY ACCOUNT LOGOUT" appears in the final negative list. Similarly, for block #2 of Response #3, a weight of 1 is assigned since it is the first time "Welcome Billy Banks" appears in the final negative list.

After appropriate weights are assigned to each text block in the final negative list, the same process is repeated for the final positive list. As shown in FIG. 4B, Response #1 includes one positive text block block #1 ("HOME SIGNUP LOGIN"). Response #2 include one positive text block block #1 ("HOME SIGNUP LOGIN"). Response #3 include two positive text blocks block #1 ("HOME SIGNUP LOGIN") and block #2 ("Please Login").

For block #1 of Response #1, a weight of 1 is assigned since it is the first time "HOME SIGNUP LOGIN" appears in the final negative list. Similar to the process for the final positive list, for block #1 of Response #2, the weight is incremented by 1 because it is the second time "HOME SIGNUP LOGIN" appears in the final positive list. Following the process, for block #1 of Response #3, the weight is incremented by 1 again because it is the third time "HOME SIGNUP LOGIN" appears in the final positive list. Similarly, for block #2 of Response #3, a weight of 1 is assigned since it is the first time "Please Login" appears in the final positive list.

After weights are assigned to each text block in each of the final positive and negative lists, the process proceeds to step V where a logged out detection signature is formed by using the most strongly weighted text blocks, i.e. the text blocks with the highest weight values. In the example shown in FIG. 4B, the negative text block "HOME MY ACCOUNT LOGOUT" receives a weight of 3, making it the strongest weighted negative block. Similarly, the positive text block "HOME SIGNUP LOGIN" receives a weight of 3, making it the strongest weighted positive block. Therefore, the negative component of the logged out detection signature would be "HOME MY ACCOUNT LOGOUT" and the positive component of the logged out detection signature would be "HOME SIGNUP LOGIN."

The logged out detection signature may comprise one or more positive components and/or one or more negative components. For example, the positive text blocks with the highest and second highest weight may be used as the positive component. Likewise, the negative text blocks with the highest and second highest weight may be used as the negative component. There is no limit in the number of positive and/or negative components in the logged out detection signature, the number of components may be determined according to system resources, algorithm preferences, etc. In addition, while generating the signature, the process may optionally store the URLs that have the highest number of matches with the components that are present in the logged out detection signature as references for further comparison purposes.

When the logged out detection signature is generated, a web assessment tool would be able to identify when a logged out event has occurred. For example, when the web assessment tool is scanning a web page, if the web page includes the positive component of the logged out detection signature but does not include the negative component of the logged out detection signature, the web assessment tool may conclude that a logged out event has occurred, and therefore a log in should be performed before continuing a scan. On the other hand, if the web page includes the negative component of the logged out detection signature but does not include the positive component of the logged out detection signature, the web assessment tool may conclude that a logged out event has not occurred, and therefore may continue with a scan. For example, the logged out event detection process may search a response of a web page for the presence of positive or negative blocks of text to check if a logged out event has occurred. For instance, for a given web page, the presence of a majority of the text blocks of the positive components of the detection signature and an absence of a majority of the text blocks of the negative components of the detection signature may indicate a logged out event has occurred. In contrast, for a given web page, the presence of a majority of the text blocks of the negative components of the detection signature and an absence of a majority of the text blocks of the positive components of the detection signature may indicate a logged out event has not occurred.

Any method of detecting a logged out event during a web assessment tool scan using the logged out event detection signature may be used. In an exemplary embodiment, a logged out event detection process may be illustrated by the flow diagram of FIG. 5. For example, a logged out event detection signature may be generated by performing the process as illustrated in FIGS. 1-3. After the logged out event detection signature has been generated, a process following the flow diagram of FIG. 5 may be performed to detect a logged out event. First, the process starts at step 505. According to FIG. 5, the process then receives a response of a web page request at step 510 and proceeds to perform a check to determine whether the content of the web page has a response body at step 515. If the check performed at step 515 determines that the content of the web page does not have a response body, the process then stops performing the detection process and ends at step 520.

Figure 5:
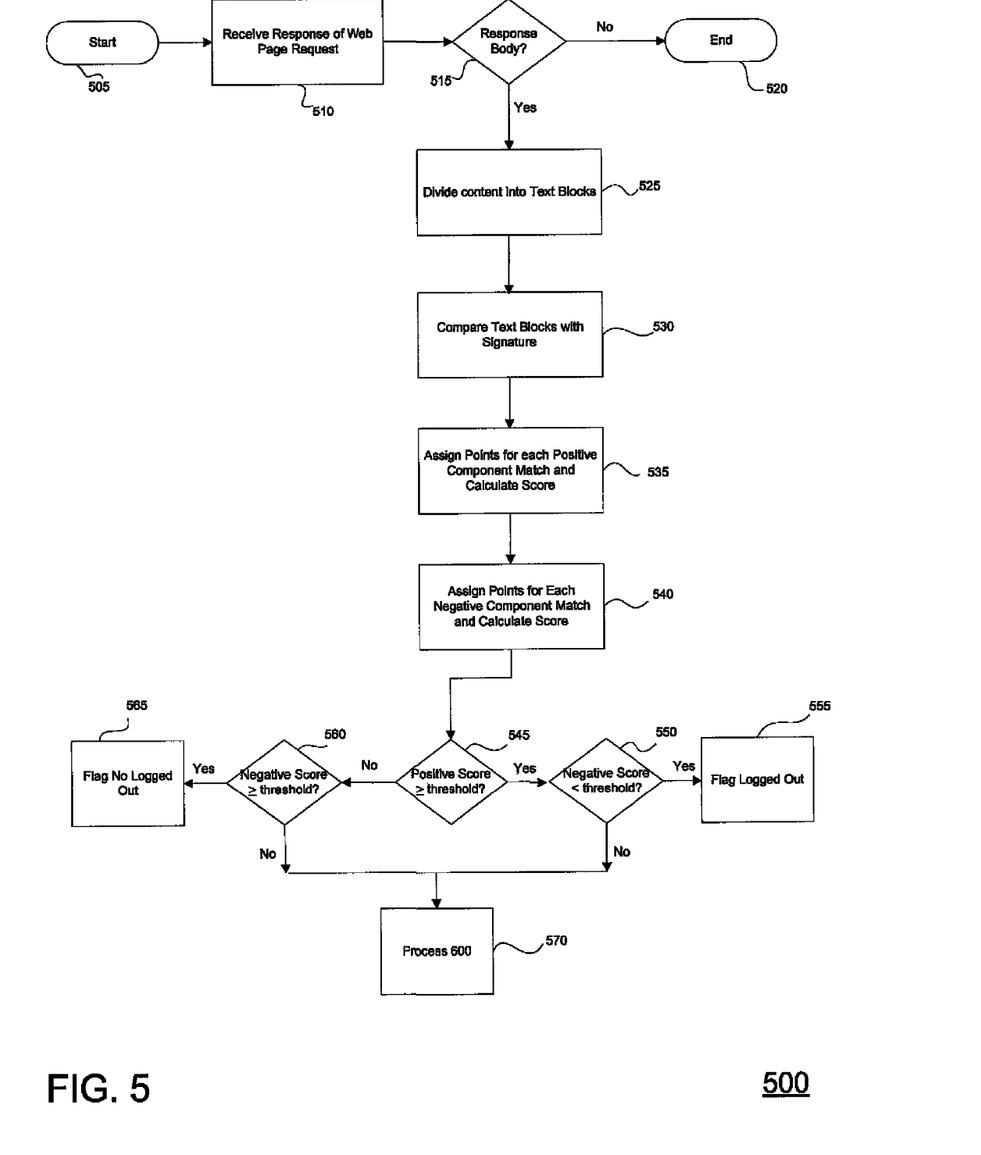
FIG. 5 is a flow diagram showing an exemplary method and system for detecting a logout event using a logout event detection signature according to one of the exemplary embodiments.

If the check performed at step 515 determines that the content of the web page has a response body, the process proceeds to step 525. At step 525, the content of the web page is divided into text blocks. The web page may be divided into one or more text blocks using the same process as the logged out detection signature process.

After the content of the web page is divided into one or more text blocks, the process proceeds to step 530, where the text blocks are compared with the positive and negative components of the detection signature. The process then proceeds to step 535, where a point is assigned for each match that is found with the positive component of the detection signature. For example, if there are ten text blocks in the positive component of the detection signature and seven of the ten text blocks are present in the web page, then a score of seven out of ten, or 70%, is assigned.

Proceeding to step 540, the process may also assign points for each match that is found with the negative component of the detection signature. For example, if there are ten text blocks in the negative component of the detection signature and one of the ten text blocks is present in the web page, then a score of one out of ten, or 10%, is assigned.

After the scores are assigned for both the negative and positive components of the signature, the process proceeds to step 545. At step 545, a check is performed to determine if the positive score exceeds (or equals) a pre-determined threshold. The threshold may be set at any score, depending on the web assessment tools or the target web site. For example, the threshold may be set at 70%. If the check at step 545 determines that the positive score exceeds (or equals) a certain threshold, the process then proceeds to step 550 where a check is performed to determine whether the negative score is below a certain threshold. If the check at step 550 determines that the negative score is below a certain threshold, processing proceeds to step 555. At step 555, a logged out event is flagged indicating a logged out event has occurred. For example, if the positive score is 75% and the negative score is 10%, the check at step 545 would determine that the positive score exceeds a threshold of 70%. At step 550, the check would determine that the negative score is below a threshold of 70%, and thus a logged out event would be flagged.

If the check at step 545 determines that the positive score does not exceed the pre-determined threshold, the process proceeds to step 560. At step 560, a check is performed to determine if the negative score exceeds (or equals to) a pre-determined threshold. If the check at step 560 determines that the negative score exceeds (or equals to) a pre-determined threshold, the process then proceeds to step 565 where a logged in event is flagged.

If the check at step 550 determines that the negative score does not exceed a pre-determined threshold, or if the check at step 560 determines that the negative score does not exceed a pre-determined threshold, the process proceeds to step 570. Two circumstances would result in processing at step 570: if the positive score and the negative score both exceeds a pre-determined threshold, or if the positive score and the negative score both do not exceed a pre-determine threshold. Both circumstances indicate that there is an ambiguity and the process may be unable to determine whether the web site is in logged in state or logged out state.

In an attempt to resolve the ambiguity, the process may retrieve the reference URLs that have been previously stored during the generation of the detection signature. Since the reference URLs help in generating the detection signature, contents of the web page of the reference URLs would provide indication as to whether a logged out event has occurred. As such, a reference URL may be requested and the reference web page is divided into reference text blocks. The reference text blocks are then compared with the positive and negative components of the detection signature. A positive score is generated based on the number of matches with the positive component of the detection signature and a negative score is generated based on the number of matches with the negative component of the detection signature. This process may be further illustrated in the flow diagram of FIG. 6.

Figure 6:
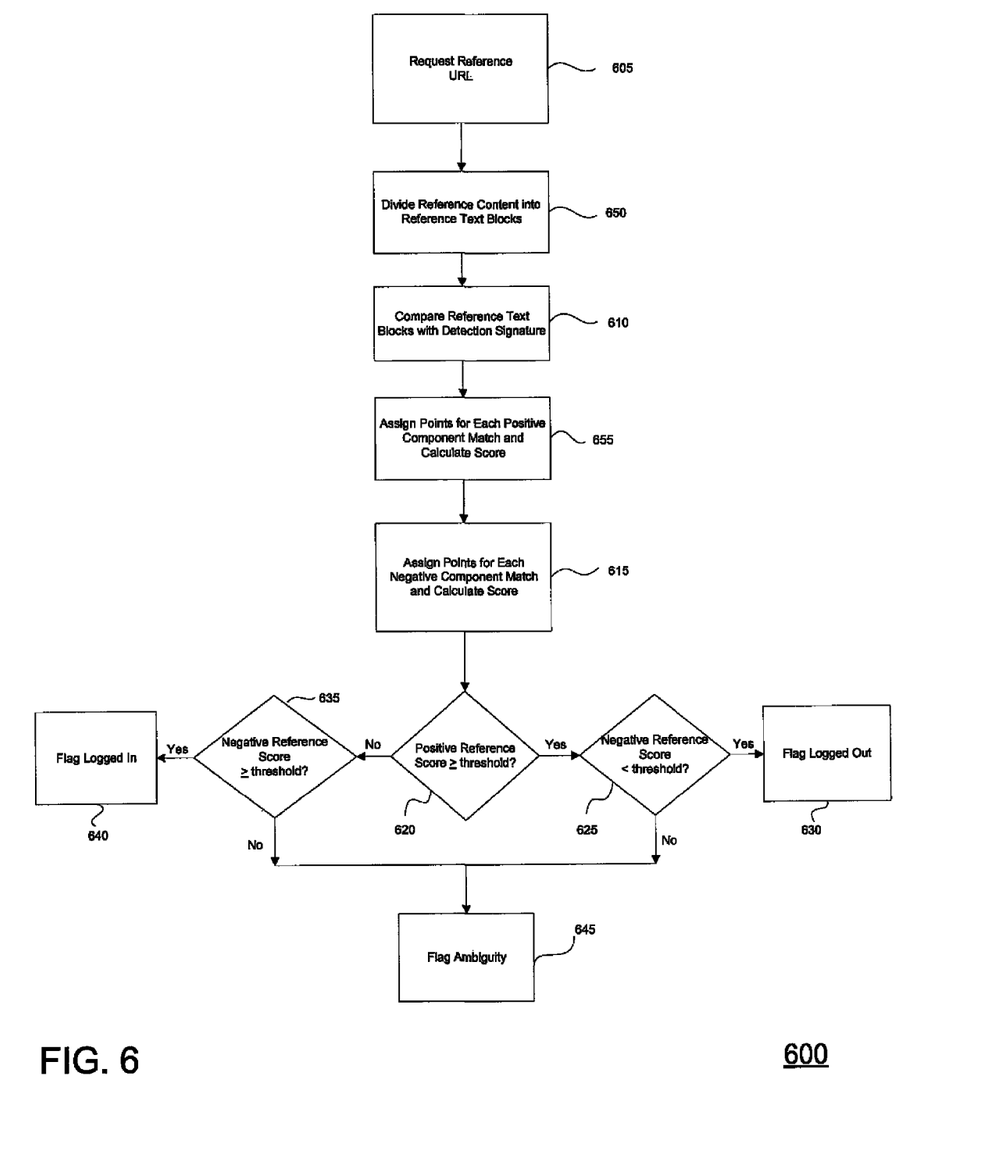
FIG. 6 is a flow diagram showing an exemplary method and system for detecting a logout event using a logout event detection signature according to one of the exemplary embodiments.

As shown in FIG. 6, at step 605, a reference URL that has been previously stored while generating the detection signature is retrieved, and the reference URL is requested. After the content of the web page of the reference URL has been received, the process proceeds to step 650 and the content of the reference web page is divided into reference text blocks. Processing then proceeds to step 610. At step 610, the reference text blocks are compared with the positive and negative components of the detection signature. The process then proceeds to step 655, where a point is assigned for each match that is found with the positive component of the detection signature. The process then proceeds to step 615. At step 615, a point is assigned for each match that is found with the negative component of the detection signature.

After the scores are assigned for both the negative and positive components of the signature, the process then proceeds to step 620 where a check is performed to determine if the positive score exceeds (or equals to) a pre-determined threshold. If the check at step 620 determines that the positive score exceeds (or equals to) a pre-determined threshold, the process proceeds to step 625.

At step 625, a check is performed to determine whether the negative score does not exceed the pre-determined threshold. If the check at step 625 determines that the negative score does not exceed the pre-determined threshold, the process then proceeds step 630, where a logged out event is flagged.

If the check at step 620 determines that the positive score does not exceed a pre-determined threshold, the process proceeds to step 635. At step 635, a check is performed to determine whether the negative score exceeds the pre-determined threshold. If the check at step 635 determines that the negative score exceeds the predetermined threshold, the process then proceeds to step 640, where a logged in event is flagged.

If the check at step 635 determines that the negative score does not exceed a pre-determined threshold, or the check at step 625 determines that the negative score exceeds (or equals to) a pre-determined threshold, the process then proceeds to step 645. At step 645, because the process may be unable to resolve the ambiguity, an ambiguity flag is raised.

Further processing may be performed to resolve the ambiguity, or alternatively, the process may select another target web page to perform the analysis.

It is understood that the herein described apparatus and methods are susceptible to various modifications and alternative constructions. There is no intention to limit the invention to the specific constructions described herein. To the contrary, the invention is intended to cover all modifications, alternative constructions, and equivalents falling within the scope and spirit of the invention.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention.

What is claimed is:

1. A computer-implemented method of generating a signature for determining whether a web page is in a first state or a second state, comprising:
   selecting a plurality of web pages for processing;
   requesting the web pages in the first state;
   dividing the first state pages into a first set of text blocks;
   requesting the web pages in the second state;
   dividing the second state pages into a second set of text blocks;
   eliminating from the first and second sets the text blocks that are common between the first set and the second set; and
   generating a signature comprising the text blocks of the first set as a component indicative of the first state and the text blocks of the second set as a component indicative of the second state.

2. The method as recited in claim 1, further comprising:
   assigning weights to each text block in the first set;
   identifying duplicate text blocks in the first set;
   incrementing the weight for each duplicate text blocks; and selecting a predetermined number of text blocks with the highest weight as the component of the signature indicative of the first state.

3. The method as recited in claim 1 wherein the first state is a logout state and the second state is a login state.

4. The method as recited in claim 1, further comprising:
requesting a target web page;
dividing the content on the target web page into target text blocks;
comparing the target text blocks with the component of the signature indicative of the first state;
assigning points for each match that is found between the component indicative of the first state and the target text blocks;
aggregating the points for each match of the component indicative of the first state to form a first score;
performing a test to determine if the first score exceeds a first threshold; and
determining the target web page to be in the first state if the first score exceeds the first threshold.

5. The method as recited in claim 4, comprising:
detecting a logout event; and
assessing web application vulnerability based on the logout event.

6. The method as recited in claim 4, further comprising:
comparing the target text blocks with the component of the signature indicative of the second state;
assigning points for each match that is found between the component indicative of the second state and the target text blocks;
aggregating the points for each component indicative of the second state match to form a second score;
performing a test to determine if the second score exceeds a second threshold; and
determining the target web page to be in the first state if the first score exceeds the first threshold and the second score does not exceed the second threshold.

7. The method as recited in claim 6 wherein the first state is a logout state and the second state is a login state.

8. The method as recited in claim 6, further comprising:
determining the target web page to be in the second state if the second score exceeds the second threshold and the first score does not exceed the first threshold.

9. The method as recited in claim 6, further comprising:
storing a web page with a maximum number of matches with the components of the signature as a reference;
if the first score exceeds the first threshold and the second score exceeds the second threshold, or, if the first score does not exceed the first threshold and the second score does not exceed the second threshold:
requesting the reference web page;
dividing the reference web page into a plurality of reference text blocks;
comparing the reference text blocks with the component of the target web site signature indicative of the first state;
assigning points for each match that is found between the component of the target web site signature indicative of the first state and the reference text blocks;
aggregating the points for first component match to form a first reference score;
performing a test to determine if the first reference score exceeds a first reference threshold; and
determining the target web page to be in the first state if the first score exceeds the first reference threshold.

10. The method as recited in claim 9, further comprising:
if the first score exceeds the first threshold and the second score exceeds the second threshold, or, if the first score does not exceed the first threshold and the second score does not exceed the second threshold:
comparing the reference text blocks with the component of the signature indicative of the second state;
assigning points for each match that is found between the component of the signature indicative of the second state and the reference text blocks;
aggregating the points for second component match to form a second reference score;
performing a test to determine if the second reference score exceeds a second reference threshold;
determining the target web page to be in the first state if the first reference score exceeds the first reference threshold and the second reference score does not exceed the second reference threshold; and
determining the target web page to be in the second state if the second reference score exceeds the second reference threshold and the first reference score does not exceed the first reference threshold.

11. A computer system, comprising:
a non-transitory storage medium and a processor, wherein the processor:
selects a plurality of web pages for processing;
requests the web pages in a first state from a web server;
divides the first state pages into a first set of text blocks;
requests the web pages in a second state from the web server;
divides the second state pages into a second set of text blocks;
eliminates from the first and second sets the text blocks that are common between the first set and the second set;
generates a signature comprising the text blocks of the first set as a component indicative of the first state and the text blocks of the second set as a component indicative of the second state; and
stores the signature in the storage medium.

12. The computer system as recited in claim 11, wherein the processor:
assigns weights to each text block in the first set;
identifies duplicate text blocks in the first set;
increments the weight for each duplicate text blocks; and
selects a predetermined number of text blocks with the highest weight as the component of the signature indicative of the first state.

13. The computer system as recited in claim 11, wherein the first state is a logout state and the second state is a login state.

14. The computer system as recited in claim 11, wherein the processor:
requests a target web page;
divides the content on the target web page into target text blocks;
compares the target text blocks with the component of the signature indicative of the first state;
assigns points for each match that is found between the component indicative of the first state and the target text blocks;
aggregates the points for each match of the component indicative of the first state to form a first score;
performs a test to determine if the first score exceeds a first threshold; and
determining the target web page to be in the first state if the first score exceeds the first threshold.

15. The computer system as recited in claim 14, wherein the processor:

detects a logout event, wherein the first state comprises the logout event; and assesses web application vulnerability based on the logout event.

16. The computer system as recited in claim 14, wherein the processor:

compares the target text blocks with the component of the signature indicative of the second state;

assigns points for each match that is found between the component indicative of the second state and the target text blocks;

aggregates the points for each component indicative of the second state match to form a second score;

performs a test to determine if the second score exceeds a second threshold;

determining the target web page to be in the first state if the first score exceeds the first threshold and the second score does not exceed the second threshold.

17. The computer system as recited in claim 16 wherein the first state is a logout state and the second state is a login state.

18. The computer system as recited in claim 16, wherein the processor:

determines the target web page to be in the second state if the second score exceeds the second threshold and the first score does not exceed the first threshold.

19. The computer system as recited in claim 16, wherein:

the storage medium stores a web page with a maximum number of matches with the components of the logout event detection signature as a reference;

if the first score exceeds the first threshold and the second score exceeds the second threshold, or, if the first score does not exceed the first threshold and the second score does not exceed the second threshold, the processor:

requests the reference web page;

divides the reference web page into a plurality of reference text blocks;

compares the reference text blocks with the component of the target web site signature indicative of the first state;

assigns points for each match that is found between the component of the target web site signature indicative of the first state and the reference text blocks;

aggregates the points for first component match to form a first reference score;

performs a test to determine if the first reference score exceeds a first reference threshold; and determining the target web page to be in the first state if the first score exceeds the first reference threshold.

20. The computer system as recited in claim 19, wherein:

if the first score exceeds the first threshold and the second score exceeds the second threshold, or, if the first score does not exceed the first threshold and the second score does not exceed the second threshold, the processor:

compares the reference text blocks with the component of the signature indicative of the second state;

assigns points for each match that is found between the component of the signature indicative of the second state and the reference text blocks;

aggregates the points for second component match to form a second reference score;

performs a test to determine if the second reference score exceeds a second reference threshold;

determining the target web page to be in the first state if the first reference score exceeds the first reference threshold and the second reference score does not exceed the second reference threshold; and determining the target web page to be in the second state if the first reference score does not exceed the first reference threshold and the second reference score exceeds the second reference threshold.

21. A non-transitory, computer storage medium storing computer code that provides instructions for a computer processor to perform the steps of:

selecting a plurality of web pages for processing;

requesting the web pages in a first state;

dividing the first state pages into a first set of text blocks;

requesting the web pages in a second state;

dividing the second state pages into a second set of text blocks;

eliminating from the first and second sets the text blocks that are common between the first set and the second set; and generating a signature comprising the text blocks of the first set as a component indicative of the first state and the text blocks of the second set as a component indicative of the second state.

* * * * *